United States Patent Office 3,796,765
Patented Mar. 12, 1974

3,796,765
PROCESS FOR DISPROPORTIONATING TOLUENE
Tomonori Shioiri, Yokohama, and Sinji Takase, Kawasaki, Japan, assignors to Nippon Oil Company, Limited, Tokyo, Japan
No Drawing. Filed Dec. 16, 1971, Ser. No. 208,886
Claims priority, application Japan, Dec. 28, 1970, 46/120,154
Int. Cl. C07c 3/62
U.S. Cl. 260—672 T  3 Claims

ABSTRACT OF THE DISCLOSURE

A process for disproportionating toluene which comprises bringing the toluene in the presence of a hydrogen-containing gas at a pressure from ordinary to 150 kg./cm.$^2$ and a temperature from 150° C. to 700° C. into contact with a catalyst obtained by halogenating crystalline aluminosilicate of the zeolite type with openings from 5 to 15 A. with one or more halogenated hydrocarbons wherein the halogen is fluorine and/or chlorine at a temperature from 0° C. to 600° C. to a halogen content from 0.05 to 15% by weight on the basis of said crystalline aluminosilicate or a catalyst containing in addition to the above a metal of the Group I–B or VIII in the Periodic Table is disclosed.

BACKGROUND OF THE INVENTION

(1) Field of the invention

This invention relates to a process for disproportionating toluene to form benzene and xylenes.

More particularly, it is concerned with a process for disproportionating toluene to form benzene and xylenes in the presence of a hydrogen-containing gas under disproportionating conditions using a catalyst obtained by halogenating crystalline aluminosilicate of the zeolite type with openings from 5 to 15 A. with halogenated hydrocarbon(s) wherein the halogen is fluorine and/or chlorine at a temperature from 0° C. to 600° C. to a halogen content from 0.05 to 15% by weight on the basis of the substrate or a catalyst containing in addition to the above a metal of the Group I–B or VIII in the Periodic Table.

(2) Description of the prior art

Heretofore, disproportionation of toluene has been carried out by such processes as thermal disproportionation process, process using a Friedel-Crafts catalyst, process by means of a silica-alumina cracking catalyst and the like. The thermal disproportionation process which is conducted at around 800° C. has been experienced with poor selectivity; the process using a Friedel-Crafts catalyst is disadvantageous in that not only the activity of the catalyst is not high but also the selectivity thereof is low; and the process using a silica-alumina catalyst has such a fatal disadvantage that, in addition to quick deterioration of the catalyst, the activity thereof is too low.

Recently, the crystalline aluminosilicate of the zeolite type with large openings has been found to have high activity and selectivity as a disproportionation catalyst. However, the use of the aluminosilicate of the zeolite type alone does not produce satisfactory results for the disproportionation of toluene, because the disproportionation of toluene is more difficult as compared with that of ethylbenzene or xylenes.

In view of the low disproportionating activity of silica-alumina when used alone a variety of methods have been hereto proposed in order to activate the silica-alumina by the introduction of halogen. For example, there have been proposed a halogenation by immersion of silica-alumina in an aqueous ammonia solution of $NH_4HF_2$ (U.S. Pat. 3,304,339), a halogenation by introducing $Cl_2$, HCl, $CCl_4$ or the like together with toluene over silica-alumina catalyst under reaction conditions (U.S. Pat. 3,126,422), a halogenation by supplying $C_6H_5F$ together with toluene over NiSe—$SiO_2$—$Al_2O_3$ catalyst under reaction conditions (U.S. Pat. 3,182,095) and an introduction of chlorine by contacting chlorosulfonic acid in gaseous phase with silica-alumina (U.S. Pat. 3,324,193). The halogenated silica-alumina catalysts obtained by these methods show higher catalytic activity than silica-alumina alone, but it is still not satisfactory with the disproportionation of toluene. Another prior method involves an introduction of halogen into Pt-alumina catalyst by halogenated hydrocarbon (U.S. Pat. 3,251,898), and even by doing so sufficiently satisfactory activity has not yet been produced.

On the other hand, as far as is known there is no prior art found at all in which crystalline aluminosilicate has been halogenated with halogenated hydrocarbon, although there has been known the mixture of crystalline aluminosilicate with $AlF_3$ (German patent application 1,193,251-2) and the introduction of chlorine by impregnating alumina matrix having dispersed therein 10–20% by weight of crystalline aluminosilicate with chloroplatinic acid an hydrochloric acid (U.S. Pat. 3,409,686). The latter is a conventional process for producing Pt-$Al_2O_3$ reforming catalyst.

Summary of the invention

It has now been discovered that halogenated hydrocarbons including $CHClF_2$, $CCl_2F_2$, $CCl_4$, $CHCl_3$ and the like are reacted with crystalline aluminosilicate supporting or not supporting a metal of the Group I–B or VIII in the Periodic Table under selected conditions to introduce halogen in any desired amount. It has also been found that the catalytic composition thus obtained shows excellent characteristics as the catalyst for disproportionating toluene. The present invention has been completed on the basis of these discoveries.

It is an object of this invention to provide a novel catalyst having high activity for disproportionating toluene by halogenating crystalline aluminosilicate of the zeolite type with halogenated hydrocarbons. Other objects will be apparent from descriptions hereinbelow.

According to the present invention, toluene may be efficiently disproportionated to form benzene and xylenes in the presence of a hydrogen-containing gas under disproportionating conditions using a catalyst obtained by halogenating crystalline aluminosilicate of the zeolite type with openings from 5 to 15 A. with halogenated hydrocarbon(s) wherein the halogen is fluorine and/or chlorine at a temperature from 0° C. to 600° C. to a halogen content from 0.05 to 15% by weight on the basis of the substrate or a catalyst containing in addition to the above a metal of the Group I–B or VIII in the Periodic Table.

It is necessary that the crystalline alumino-silicates used in this invention have openings of 5 A. or larger in effective size so as to not hinder the entrance and exit of the starting and produced materials. Those belonging to the groups of chabazite, heulandite, mordenite and faujasite are mentioned as crystalline aluminosilicate used in this invention, and, from the practical point of view, zeolites X and Y of faujasite type and synthetic mordenite, which are synthesized and commercially available, as well as natural mordenite and clinoptilolite are preferred. They contain exchangeable cations and may be utilized without any treatment. If higher activities are desired, it is preferable to convert them to the H or decationized form by the ion exchange with a rare earth metal or the ion exchange with ammonium ion followed by calcination, or alternatively, to convert them to the H or decationized form containing a small amount of a divalent or higher metal ion. Whereas the crystal structure of zeolites of faujasite type is decomposable with acid, the crystal structures of synthetic mordenite, natural mordenite and natural clinoptilolite, which have high silica-alumina ratio, are not decomposable with acid. The latter, therefore, can be converted to the H form having higher Si/Al ratio by ion-exchanging with acid and simultaneously by hydrolyzing the Si—O—Al bond to remove some of aluminum while maintaining the crystal structure. The extent of ion exchange is higher than 50% and preferably higher than 80%.

Although the crystalline aluminosilicate according to the present invention shows a satisfactory activity in the absence of metal, a metal of the Group IV or VIII may be contained in order to reduce fouling of the catalyst. Among the metals of the Group I-B, Ag, for example, may be supported on crystalline aluminosilicate by ion exchange or impregnation. The metals of the Group VIII such as Ni, Rh, Pd, Ir, Pt and Os may be supported on crystalline aluminosilicate by ion exchange or impregnation.

These metals are preferred to be used together with such as element as arsenic, antimony, bismuth, sulfur or selenium supported on the crystalline aluminosilicate by impregnation or treatment with compounds containing above-mentioned elements, because these metals are apt to accelerate hydrogenation or decomposition of hydrocarbons when used alone. The supported amount of the metals of the Group I-B, e.g. Ag is preferably 0.1-10% by weight, and the one of the metals of the Group VIII is 0.01-2% by weight on the basis of the weight of the crystalline aluminosilicate. Arsenic, antimony, bismuth, sulfur or selenium is preferably included in an atomic ratio form 0.1 to 1.0 on the basis of the metal of the Group VIII.

The crystalline aluminosilicate supporting or not supporting the metal and another element is subjected to drying and calcining and, if molding is required, to extrusion or tabletting or the like after incorporation of a binding agent.

The halogenated hydrocarbons used in this invention are hydrocarbons in which one or more of the hydrogens are substituted with chlorine and/or fluorine. Typical useful compounds include $CH_2Cl_2$, $CHCl_3$, $CCl_4$, $CF_4$, $CHF_3$, $CH_2F_2$, $CHClF_2$, $CCl_2F_2$, $CClF_3$, $CHCl_2F$, $CCl_3F$, $CClF_2$-$CClF_2$, $C_6H_5F$ and the like. The halogenated hydrocarbons containing 6 or less carbon atoms are more effectively and economically used in this invention.

To illustrate an embodiment of the halogenation method, a crystalline aluminosilicate of the zeolite type supporting or not supporting a metal and another element is thoroughly dried under such as gas as air, nitrogen, oxygen or hydrogen at 300–600° C. for one hour or longer and, while maintaining a predetermined temperature, contacted with the aforementioned halogenated compound in association with a gas such as nitrogen, air, oxygen or hydrogen containing or not containing steam for a predetermined period of time and then with a gas such as nitrogen, air, oxygen or hydrogen alone in order to expel the unreacted halogenated compound and other by-products. The product is cooled and stored under moisture-proof conditions.

The above-mentioned reaction may be conducted either in a flow reaction tube or in a closed reaction vessel. The halogen content contained in the crystalline aluminosilicate can be adjusted by controlling the reaction temperature and the amount of halogenating agent contacted. The halogen content should be adjusted within an appropriate range, preferably from 0.05 to 15% by weight on the basis of the weight of the crystalline aluminosilicate, since the amount of halogen more than 15% is not economical. To be more important, the catalytic activity cannot be controlled by the halogen content only. The higher the halogenation temperature, the more amount of halogen is introduced. However, at a too high temperature, crystalline aluminosilicates with the lower Si/Al ratio will undergo decomposition of the crystal structure to the greater extent finally losing the inherent activity. Therefore, the halogenation temperature in the case of crystalline aluminosilicates with a low Si/Al ratio is preferably lower. In the case of crystalline aluminosilicates with a high Si/Al ratio such as synthetic mordenite and natural mordenite, on the contrary, the introduction of halogen can be effected in the presence of steam at a high temperature without decomposition of the crystal structure and accordingly the halogenation at a lower temperature is not necessarily required with the crystalline aluminosilicate with a high Si/Al ratio. The halogenation temperature should be appropriately chosen depending on the nature of crystalline aluminosilicate from the range from 0° C. to 600° C. and preferably 100° C. to 500° C.

Whereas in case of a given crystalline aluminosilicate of zeolite type and a given halogenating agent, appropriate selection of reaction temperature and contacting time will result in the formation of the catalyst composition with desired halogen content, it should also be paid a caution that the kind of halogenating agent used influences on the content of halogen introduced. In other words, reactivity of the halogenating agents with the crystalline aluminosilicate of the zeolite type varies depending upon the kinds of the crystalline aluminosilicate used; some of them are reactive at lower temperatures and the others do not readily react at a low temperature. From the practical point of view it is preferred to use a halogenating agent that is highly reactive with crystalline aluminosilicates of the zeolite type. Preferred halogenating agents are $CH_2Cl_2$, $CHCl_3$, $CCl_4$, $CHClF_2$, $CCl_2F_2$, $CClF_2$—$CClF_2$ and $C_6H_5F$.

Disproportionation reaction of toluene using the catalysts prepared as described above is carried out under the following conditions: Reaction temperature, 150–700° C., preferably 200–600° C.; reaction pressure, ordinary—150 kg./cm.$^2$, preferably ordinary—100 kg./cm.$^2$; space velocity, 0.05–25 wt./wt./hr., preferably 0.1–20 wt./wt./hr.; and hydrogen-to-hydrocarbon molar ratio, preferably 1–50 mol./mol.

The toluene as referred to herein is toluene or a hydrocarbon fraction containing toluene.

The catalysts according to the present invention have higher disproportionating ativity for toluene, better selectivity and lower formation of cokes than with a non-halogenated crystalline aluminosilicate supporting or not supporting a metal or compound thereof.

DESCRIPTION OF PREFERRED EMBODIMENTS

The process of the invention will be more clearly described by the following examples:

EXAMPLE 1

100 g. of natural mordenite produced in Shiraishi City, Miyagi Prefecture, Japan was pulverized to a 100-mesh size and then added to 1 liter of 2 N HCl aqueous solution, followed by heating under reflux for 4 hours. The acidic solution containing Na, K, Mg, Ca, Fe, Si, Al and the like was separated by filtration and additional 1 liter of 2 N HCl aqueous solution added to the residue, followed by heating under reflux for 4 hours. The procedures were repeated nine times and the resulting mass washed with water and dried. As a result of the hydrochloric acid treatment, the amount of benzene adsorbed at a benzene partial pressure of 44 mm. Hg was increased from 1.11% by weight to 8.88% by weight. To the natural mordenite treated with hydrochloric acid was admixed bentonite to a content of 20% by weight and the mixture was molded, dried at 120° C. and calcined at 500° C. The product is referred to as Catalyst A hereinbelow.

In a quartz reaction tube were placed 10 g. of Catalyst A, which were then dried under nitrogen stream at 400° C. for 1 hour and cooled to 200° C., at which temperature $CHClF_2$ was passed at a flow rate of 50 ml./min. together with $N_2$ gas passed through water at 25° C. at a flow rate of 100 ml./min. for 10 min. After completion of the reaction, $N_2$ gas alone was passed for about 1 hour over the resulting catalyst, which was then stored in a moisture-proof vessel. Contents of chlorine and fluorine in the resulting catalyst were 0.23% by weight and 2.78% by weight, respectively. It is referred to as Catalyst B hereinbelow.

Disproportionation reactions of toluene were carried out respectively with 5 g. of Catalysts A and B for a mixture of hydrogen and toluene charged in a flow reaction vessel. The results are shown in Table 1.

TABLE 1

Disproportionation of toluene using Catalysts A and B, respectively:

|  | Catalyst | |
| --- | --- | --- |
|  | A | B |
| Reaction condition: |  |  |
| Pressure, kg./cm.² G | 50 | 50 |
| Temperature, 9° C | 300 | 300 |
| WHSV, g./g./hr | 1 | 1 |
| H₂/toluene, mol./mol | 10 | 10 |
| Analysis of the product: |  |  |
| Decomposition product having not more than six carbon atoms | Trace | Trace |
| Benzene | 11.08 | 14.31 |
| Toluene | 79.60 | 72.50 |
| p-Xylene | 2.46 | 3.31 |
| m-Xylene | 5.12 | 6.78 |
| o-Xylene | 1.74 | 3.10 |
| Other aromatics having not lower than eight carbon atoms | Trace | Trace |

The results in Table 1 reveal that the halogenated Catalyst B exerts superior disproportionating activities to the non-halogenated Catalyst A.

EXAMPLE 2

In 200 ml. of a 0.5 molar aqueous solution of $Ni(NO_3)_2$ were placed 20 g. of Catalyst A prepared in Example 1 and the ion exchanging was conducted at 90° C. for 3 hours. The resulting mass was washed with water, dried and sulfurized with $H_2S$ to yield a catalyst supporting 1.0% of Ni. It is referred to as Catalyst C hereinbelow.

In a quartz reaction tube were placed 10 g. of Catalyst C, which were dried under nitrogen stream at 500° C. for 2 hours and cooled to 400° C., at which temperature nitrogen gas passed through carbon tetrachloride and water maintained at room temperature was introduced at a flow rate of 100 ml./min. for 15 min. After completion of the reaction, nitrogen gas alone was pased for about 1 hour over the resulting catalyst, which was then stored in a moisture-proof vessel. Chlorine content of the resulting catalyst was 2.20% by weight. The catalyst is referred to as Catalyst D hereinbelow.

In order to compare Catalysts C and D the disproportionations of toluene were carried out with the results shown in Table 2.

TABLE 2

Disproportionation of toluene using Catalysts C and D, respectively:

|  | Catalyst | |
| --- | --- | --- |
|  | C | D |
| Reaction condition: |  |  |
| Temperature, ° C | 350 | 350 |
| Pressure | Normal | Normal |
| WHSV, g./g./hr | 0.5 | 0.5 |
| H₂/toluene, mole/mole | 27 | 27 |
| Distribution of the products, mole percent; |  |  |
| Decomposition product having not more than six carbon atoms | 2.74 | 2.17 |
| Benzene | 7.61 | 18.10 |
| Toluene | 84.40 | 65.40 |
| p-Xylene | 1.29 | 3.60 |
| m-Xylene | 2.77 | 7.48 |
| o-Xylene | 1.19 | 3.02 |
| Other aromatics having not less than eight carbon atoms | (¹) | 0.23 |

¹ Trace.

The results in Table 2 reveal that the halogenated Catalyst D exerts far superior activities to the non-halogenated Catalyst C.

EXAMPLE 3

In 1 liter of a 0.2 molar aqueous solution of $NH_4NO_3$ were placed 100 g. of commercially avilable synthetic mordenite (product manufactured by Norton Company). The mixture was stirred at room temperature for 2 hours and filtered. To the residue was added additional 1 liter of the aqueous solution of $NH_4NO_3$. The procedures were repeated nine times. The resulting mass was washed with water and placed in an aqueous solution of $Pd(NH_3)_4^{++}$ ion to support Pd by ion exchange in a proportion of 0.05% by weight in terms of metallic palladium on the basis of the substrate. The resulting mass was then immersed in an aqueous solution of $SeO_2$ to support Se at an atomic ratio of Pd/Se of 0.5. The resulting catalyst was washed with water followed by incorporation of a binding agent. The mixture was molded, dried and calcined. It is referred to as Catalyst E hereinbelow.

In a quartz reaction tube were placed 10 g. of Catalyst E, which were then dried under hydrogen stream at 440° C. and cooled to 300° C., at which temperature $CCl_2F_2$ was passed at a flow rate of 50 ml./min. together with nitrogen passed through water at room temperature at a flow rate of 100 ml./min. for 5 min. After completion of the reaction nitrogen gas alone was passed for about 1 hour over the resulting catalyst, which was then stored in a moisture-proof vessel. Chlorine and fluorine contents of the catalysts were 0% by weight and 3.18% by weight, respectively. The catalyst is referred to as Catalyst F hereinbelow.

In order to compare Catalysts E and F, the disproportionations of toluene were carried out under the same conditions with the results shown in Table 3.

TABLE 3

Disproportionation of toluene using Catalysts E and F, respectively:

|  | Catalyst | |
| --- | --- | --- |
|  | E | F |
| Reaction condition: |  |  |
| Pressure | Normal | Normal |
| Temperature, ° C | 380 | 380 |
| WHSV, g./g./hr | 0.5 | 0.5 |
| H²/toluene, mole/mole | 27 | 27 |
| Distribution of the products, mole percent: |  |  |
| Decomposition product having not more than six carbon atoms | 2.86 | 2.44 |
| Benzene | 4.92 | 18.38 |
| Toluene | 88.02 | 62.26 |
| p-Xylene | 1.07 | 3.79 |
| m-Xylene | 2.23 | 8.00 |
| o-Xylene | 0.90 | 3.43 |
| Other aromatics having not less than eight carbon atoms | (¹) | 1.70 |

¹ Trace.

The results in Table 3 indicate that the halogenated catalyst F is far superior in activity to the non-halogenated catalyst E.

EXAMPLE 4

In 600 ml. of a molar aqueous solution of $NH_4NO_3$ were placed 100 g. of commercially available zeolite molecular sieve of the Na-Y type, followed by stirring at 80° C. for 2 hours and filtration. The filtrate was separated and to the residue added addition 600 ml. of the aqueous solution of $NH_4OH_3$. The mixture was stirred at 80° C. for 2 hours. The procedures were repeated 20 times followed by washing with water. 88% of the Na originally present in the zeolite was removed. A part of the resulting mass was further subjected to an ion exchange using an aqueous solution of $AgNO_3$ to support 1% by weight of Ag. The resulting catalyst was molded, dried and calcined. It is referred to as Catalyst G hereinbelow. Another part of the above-cited mass was subjected to an ion exchange using $Pt(NH_3)_4^{++}$ ion to support 0.1% by weight of Pt, followed by impregnation in a hot aqueous solution of $As_2O_3$ to an arsenic-platinum atomic ratio of 1:1. The resulting catalyst was molded, dried and calcined. It is referred to as Catalyst J hereinbelow.

In a quartz reaction tube were placed 10 g. of Catalyst G, which were then dried in air at 350° C. for 3 hours. While maintaining the temperature of the catalyst at 180° C., nitrogen gas passed through $CH_2Cl_2$ at 0° C. was introduced at a flow rate of 50 ml./min. for 30 min. After completion of the reaction nitrogen gas was passed for 1 hour over the resulting catalyst, which was then stored in a mositure-proof vessel. Chlorine content of the resulting catalyst was 2.32% by weight. It is referred to as Catalyst H hereinbelow.

In a quartz reaction tube were placed 10 g. of Catalyst J, which were then dried under nitrogen stream at 500° C. for 3 hours and cooled to 250° C., at which temperature $CClF_2$—$CClF_2$ was passed at a flow rate of 50 ml./min. together with nitrogen gas at a flow rate of 100 ml./min. for 10 min. After completion of the reaction nitrogen gas was passed for about 1 hour over the resulting catalyst, which was stored in a moisture-proof vessel. Chlorine and fluorine contents of the resulting catalyst were 0.18% by weight and 0.15% by weight, respectively. It is referred to as Catalyst K hereinbelow.

In order to make comparison among Catalysts G, H, J and K, the disproportionations of toluene were carried out under following conditions: Normal pressure, 400° C., WHSV of 0.5 g./g./hr. and $H_2$/toluene of 27 mole/mole with the results shown in Table 4.

TABLE 4

Disproportionation of toluene using Catalysts G, H, J and K, respectively:

|  | Mol percent of catalyst— | | | |
| --- | --- | --- | --- | --- |
|  | G | H | J | K |
| Benzene | 5.42 | 17.70 | 5.48 | 9.41 |
| Toluene | 89.76 | 68.32 | 88.87 | 83.06 |
| p-Xylene | 1.04 | 3.36 | 1.30 | 1.77 |
| m-Xylene | 2.17 | 6.90 | 2.30 | 3.52 |
| o-Xylene | 0.86 | 3.10 | 1.02 | 1.40 |
| Others | 0.75 | 0.58 | 1.03 | 0.84 |

The results in Table 4 indicate that the halogenated catalysts H and K exert far superior disproportionating activities to the non-halogenated catalysts.

What is claimed is:

1. A process for disproportionating toluene which comprises contacting toluene with a hydrogen-containing gas at a pressure from about atmospheric to 150 kg./cm.$^2$ and a temperature from 150° C. to 700° C. in the presence of a catalyst obtained by halogenating crystaline aluminosilicate of the zeolite type with openings from 5 to 15 A. with at least one halogenated hydrocarbon wherein the halogen is at least one of fluorine and chlorine at a temperature from 0° C. to 600° C. to a halogen content from 0.05 to 15% by weight on the basis of said crystalline aluminosilicate.

2. A process according to claim 1 wherein the halogenated hydrocarbon is selected from the group consisting of $CH_2Cl_2$, $CHCl_3$, $CCl_4$, $CF_4$, $CHF_3$, $CH_2F_2$, $CHClF_2$, $CCl_2F_2$, $CClF_3$, $CHCl_2F$, $CCl_3F$, $CClF_2$—$CClF_2$ and $C_6H_5F$.

3. A process as in claim 1 wherein the catalyst additionally contains at least one member selected from the group consisting of metals of Group I-B and VIII of the Periodic Table

References Cited

UNITED STATES PATENTS

| 3,463,744 | 8/1969 | Mitsche | 260—672 T |
| 3,464,929 | 9/1969 | Mitsche | 260—672 T |

FOREIGN PATENTS

| 2,010,551 | 11/1970 | Germany. | |

CURTIS R. DAVIS, Primary Examiner

UNITED STATES PATENT OFFICE
CERTIFICATE OF CORRECTION

Patent No. 3,796,765  Dated March 12, 1974

Inventor(s) Tomonori Shioiri et al.

It is certified that error appears in the above-identified patent and that said Letters Patent are hereby corrected as shown below:

Column 5, line 38, cancel "9". Column 7, line 11, "$NH_4OH_3$" should read -- $NH_4NO_3$ --.

Signed and sealed this 12th day of November 1974.

(SEAL)
Attest:

McCOY M. GIBSON JR.  C. MARSHALL DANN
Attesting Officer  Commissioner of Patents